June 8, 1965   L. D. BARRETT ETAL   3,187,818
BLADE FOLDING MECHANISM
Filed Dec. 31, 1964   6 Sheets-Sheet 1

INVENTORS
LAWRENCE D. BARRETT,
NORMAN E. MERRELL,
VICTOR S. MOSINSKIS
& PAUL RUTTKAY

BY *Vieek and McDonnell*

THEIR ATTORNEYS

June 8, 1965   L. D. BARRETT ETAL   3,187,818
BLADE FOLDING MECHANISM
Filed Dec. 31, 1964   6 Sheets-Sheet 2
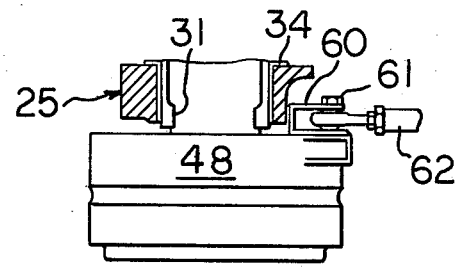
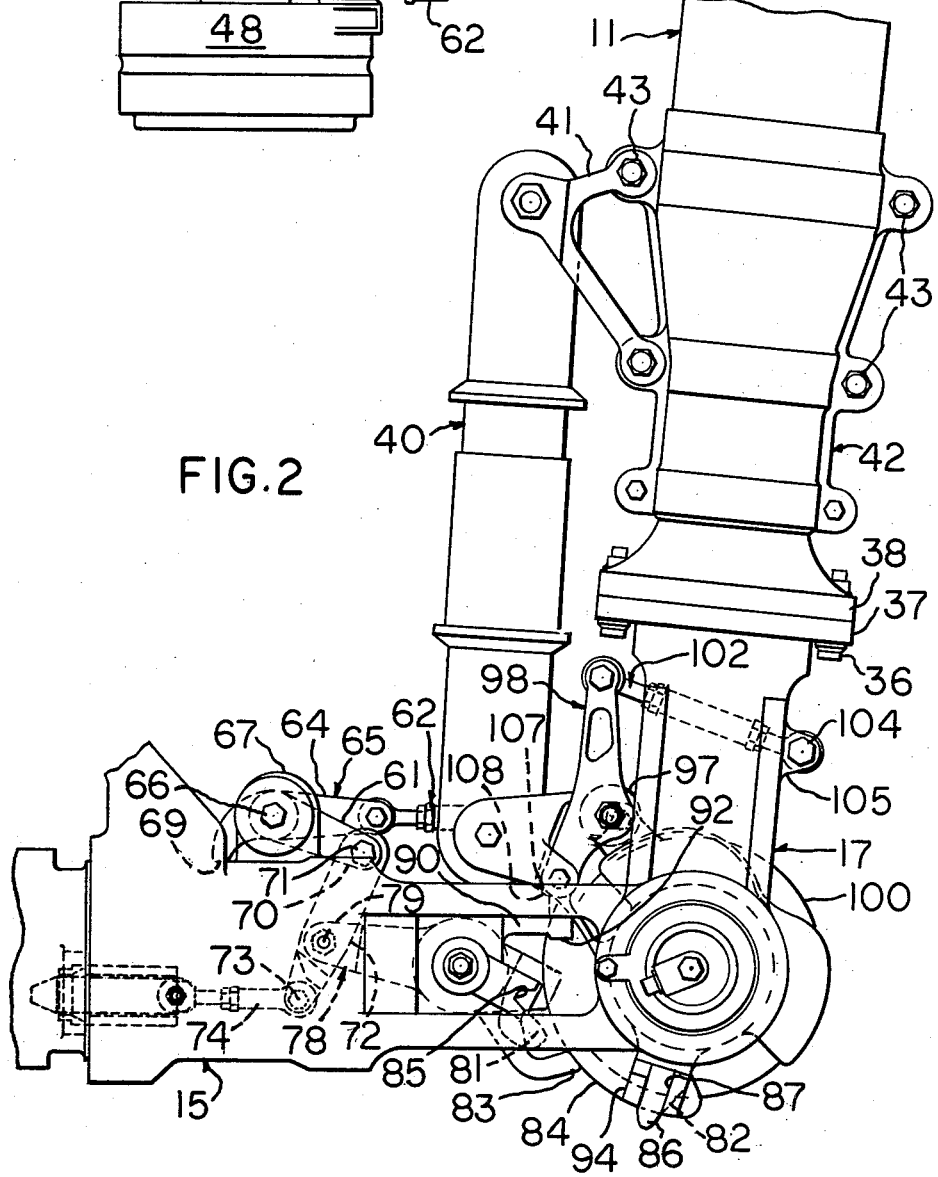

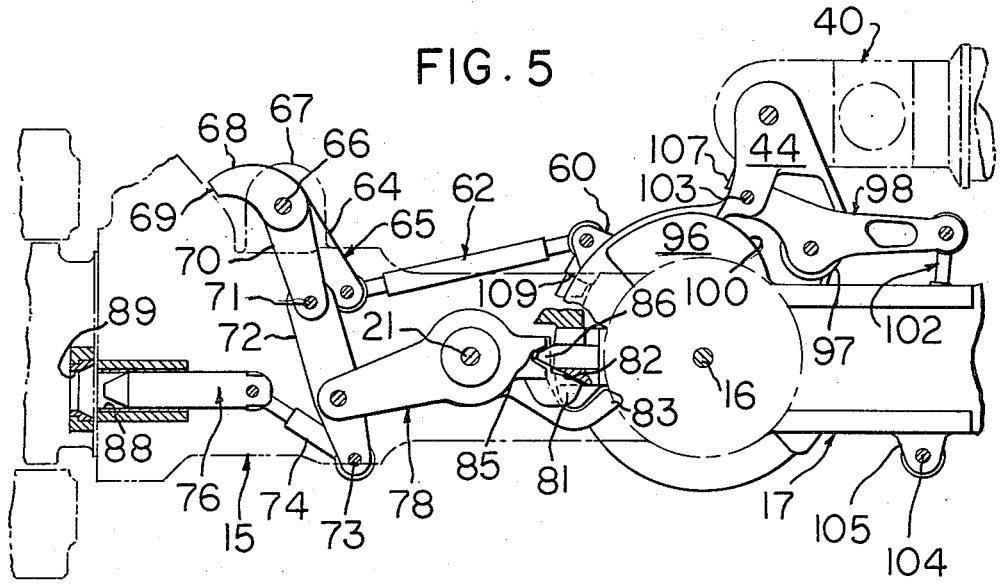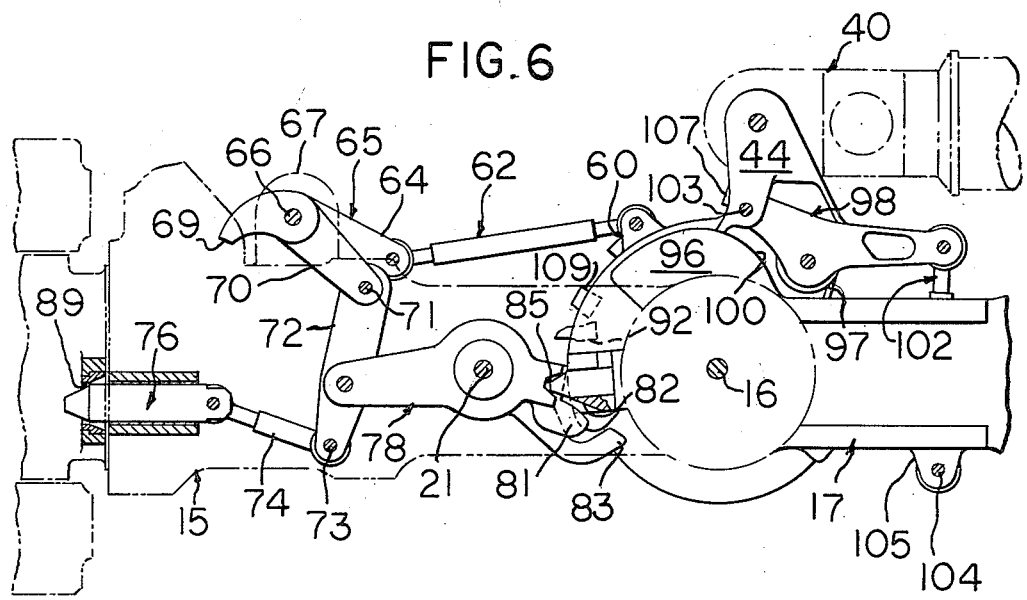

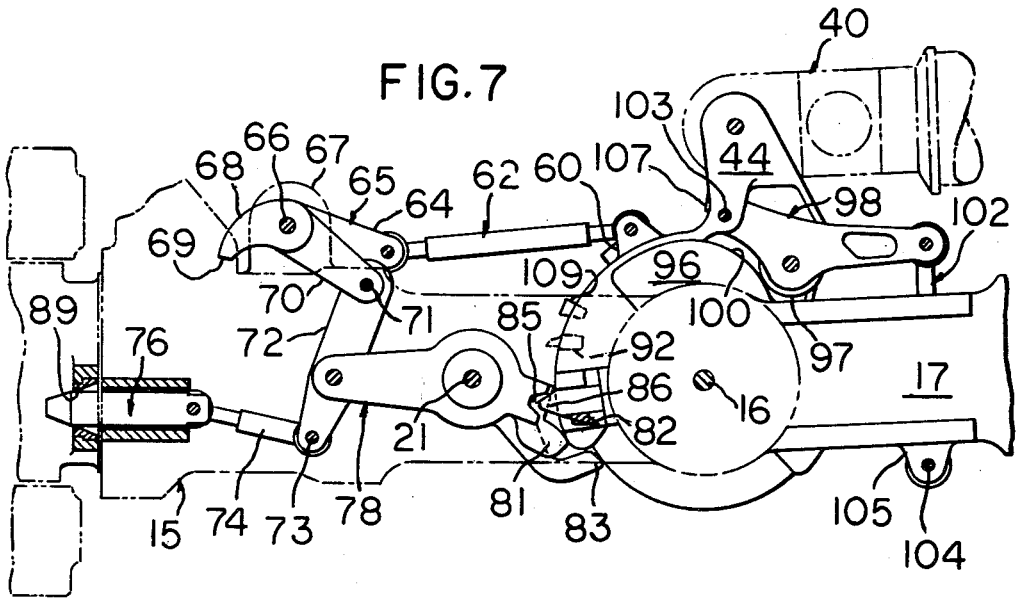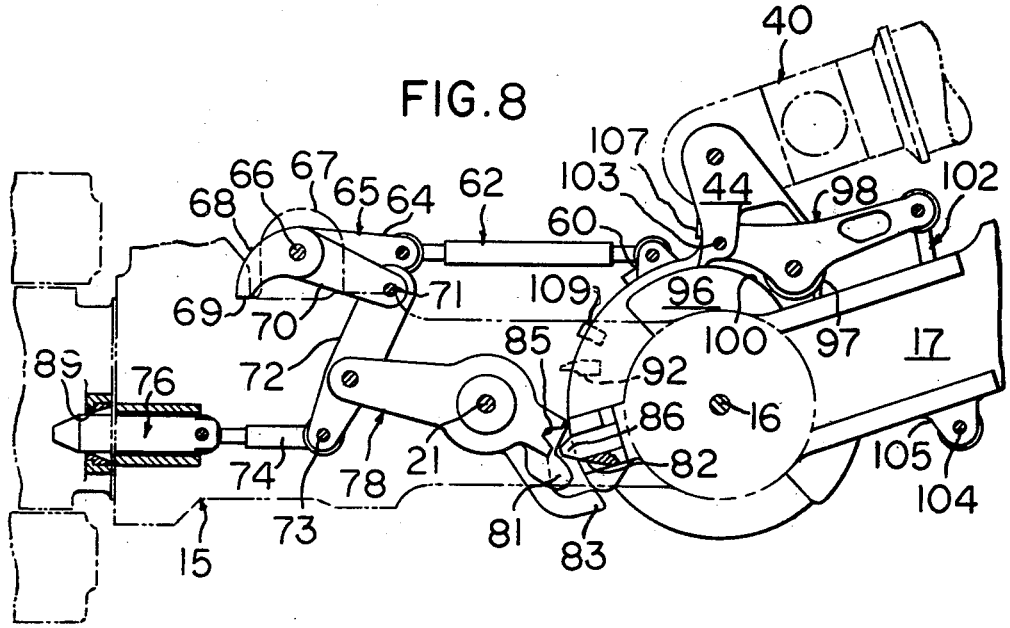

United States Patent Office 3,187,818
Patented June 8, 1965

3,187,818
BLADE FOLDING MECHANISM
Lawrence D. Barrett, Glen Mills, Norman E. Merrell, Perkiomenville, Victor S. Mosinskis, Springfield, and Paul Ruttkay, Rutledge, Pa., assignors to The Boeing Company, Seattle, Wash., a corporation of Delaware
Filed Dec. 31, 1964, Ser. No. 422,765
17 Claims. (Cl. 170—160.12)

This invention relates to a rotary wing aircraft and, more particularly, to a mechanism for folding and unfolding rotor blades of a rotary wing aircraft.

When parking rotary wing aircraft such as helicopters, it is often desirable to fold the rotor blades over the helicopter fuselage. This operation greatly reduces the amount of helicopter storage and handling area, which is required during stowing and parking maneuvers. Furthermore, folding of the rotor blades is desirable from a safety standpoint since the helicopter is less susceptible to damage by wind, particularly gusts, when it is parked. Additionally, when helicopters are employed on surface ships such as aircraft carriers, folding of the rotor blades enables transport of the helicopter to and from the hangar deck by elevators.

The folding of helicopter rotor blades has previously been accomplished both manually and by power blade folding mechanism. Prior to manually folding the rotor blades, it has been necessary to dephase the rotors, insert pitch lock pins, and disengage blade dampers. Environmental conditions, such as the combined velocities of headwinds and an aircraft carrier when a helicopter is disposed thereon, further complicate this manual procedure.

Various types of power blade folding mechanisms have been employed in the past. These have included devices in which separate actuators were utilized for each of the operations that is performed in the manual operation. Another type of power blade folding apparatus, which has been used previously, was one in which the actuating mechanism, due to its configuration, created inherent aerodynamic problems during the rotor blade's operation in flight. Some power blade folding mechanisms have previously utilized additional hinge structure about which the folded portion was pivoted.

The present invention satisfactorily solves these problems by employing a compact mechanism, which is streamlined so as to minimize aerodynamic problems when the rotor blade is operating during flight. The present invention aids in eliminating the need of additional hinge structure, which adds undesired weight to the rotor blade, by utilizing the lead-lag hinge as the pivot point for the folding operation and, more particularly, positioning the blade in a predetermined lead-lag position when it is being moved to its folded position. This invention accomplishes the above advantages while utilizing a single actuating mechanism to perform all the desired functions in the proper sequence.

While limited lead-lag freedom is necessary during normal flight operations, such lead-lag movements are not desired during blade folding operations. That is, whether it is desired to fold one or more blades of a single rotor or a plural rotor helicopter, it is of importance to maintain such blades in a predetermined position. This requirement becomes particularly important when considering that most power blade folding is a complex sequencing operation with the desired result necessitating placement in a particular pattern within a predetermined envelope as quickly as possible. Thus, controlled lead-lag movement during blade folding is necessary to avoid damage to helicopter structure and other proximate objects including personnel.

Accordingly, an object of the present invention is to provide an uncomplicated and aerodynamically improved mechanism that operates to automatically and rapidly fold and unfold a portion of a helicopter rotor blade.

Another object of this invention is to provide an improved mechanism for controlling lead-lag movement of a rotor blade during folding and unfolding movements thereof and while in its folded position.

A further object is to provide a mechanism which accomplishes all portions of the folding operation with a single power means.

Still another object of this invention is to provide a folding mechanism for eliminating lead-lag movements normally permitted by damping means connected across a rotor blade lead-lag pivot without disconnecting the damping means during folding of the rotor blade about the lead-lag pivot.

A still further object of this invention is to provide a power rotor blade folding mechanism for pivoting the rotor blade about its lead-lag pivot and for controlling the lead-lag motions of the rotor blade during folding and unfolding movements and during periods in the folded position.

Other objects of this invention will be readily perceived from the following description, claims, and drawings.

This invention relates to a rotary wing aircraft having a lead-lag pivot. Rotor blade means is movable about the lead-lag pivot. Lead-lag movements of the rotor blade means about the lead-lag pivot are controlled by suitable means. The invention includes the improvement of a mechanism for folding and unfolding the rotor blade means about the lead-lag pivot. The mechanism includes means to move the rotor blade means about the lead-lag pivot from its unfolded position to its folded position and means to inactivate the lead-lag control means during movement of the rotor blade means to its folded position whereby undesired lead-lag movements of the rotor blade means are eliminated during folding of the rotor blade means and its folded position is accurately predetermined.

This invention also relates to lead-lag restricting means in a rotary wing having first and second members connected in lead-lag relationship and first control means connected to the first and second members for permitting predetermined lead-lag motions therebetween. The lead-lag restricting means includes first movable connection means for connecting the first control means to the first member and second movable connection means connected to the first movable connection means and the second member. The second movable connection means is responsive to movement of the first movable connection means for providing relative movement between the second member and the first control means. Additionally, the lead-lag restricting means includes second control means mounted on the first member for controlling movement of the second movable connection means. Thus, movement of the second movable connection means restricts the predetermined lead-lag motions permitted by the first control means when the second member is being folded about its lead-lag connection with the first member.

The attached drawings illustrate a preferred embodiment of the invention, in which FIGURE 1 is a top plan view, partly in section, of a portion of a helicopter rotor blade including the blade-folding mechanism of the present invention with the rotor blade in its flight or unfolded position;

FIGURE 2 is a top plan view, similar to a portion of FIGURE 1, and showing the rotor blade in its folded position;

FIGURE 4 is a side elevational view, partly in section, of a portion of the structure of FIGURE 3 taken from the opposite side of FIGURE 3 and showing one of the connections of the actuating unit;

FIGURE 5 is a schematic plan view, partly in section, of a portion of a helicopter rotor blade including the blade-folding mechanism of the present invention with the blade in its flight or unfolded position;

FIGURE 6 is a schematic view, similar to FIGURE 5, at a point during folding operations at which the blade pitch is being locked and the folding of the blade is beginning;

FIGURE 7 is a schematic view, similar to FIGURE 5, at a point during folding operations beyond that of FIGURE 6 in which a gear sector is disengaged from the linkage for the pitch lock pin;

FIGURE 8 is a schematic view, similar to FIGURE 5, at a point during folding operations beyond that of FIGURE 7 in which the pitch lock pin is fully engaged in its locking position and further movement of the driving mechanism for the linkage for the pitch lock pin is prevented;

Figure 1:
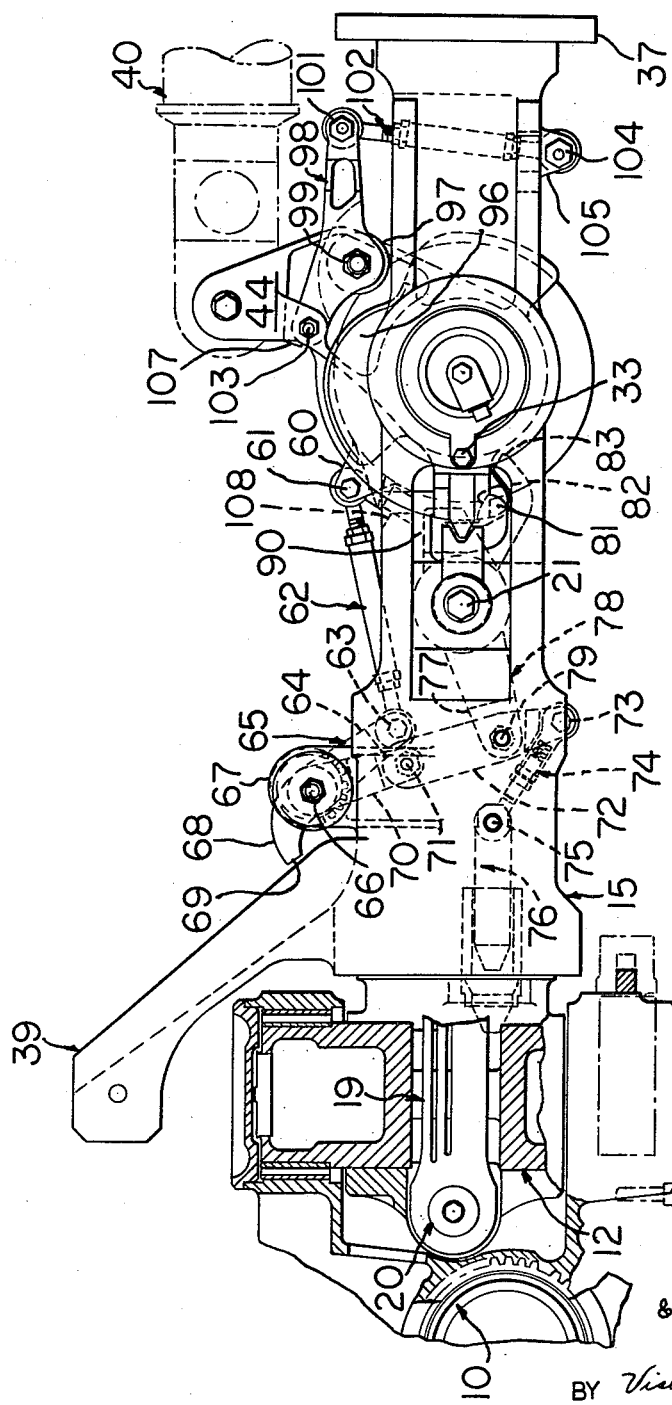
Figure 3:
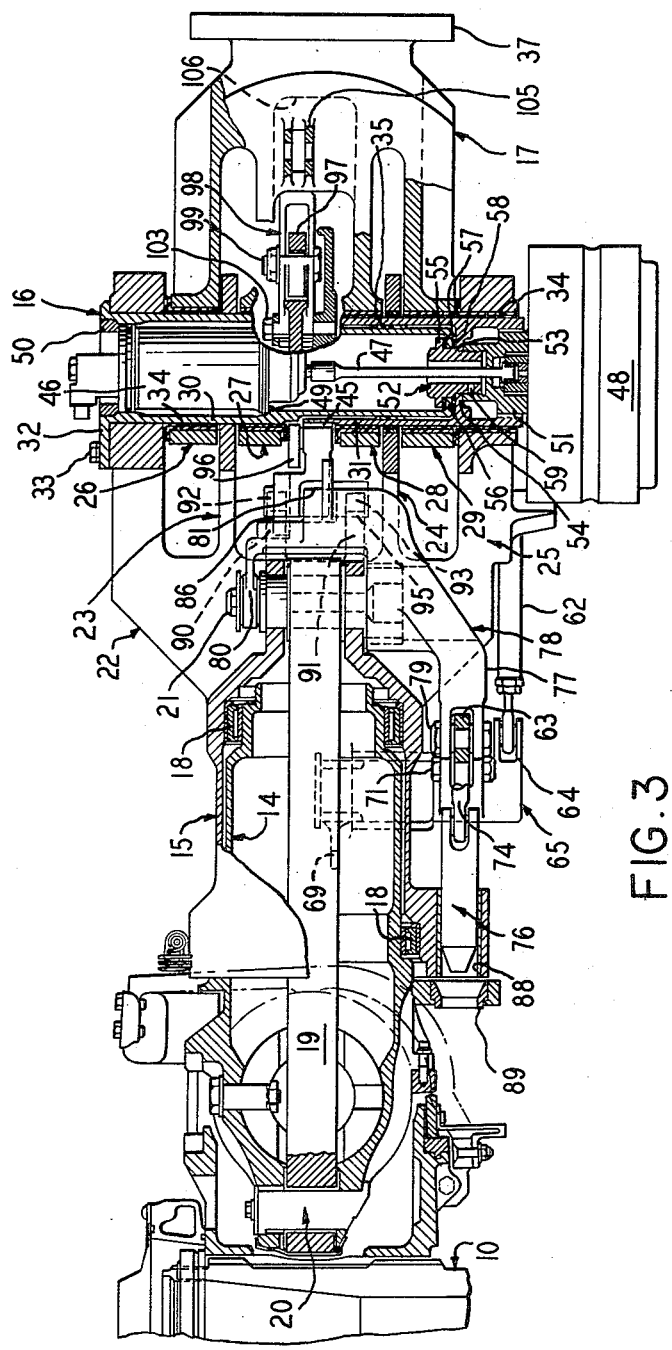
FIGURE 3 is a side sectional view, partly in elevation, of the structure of FIGURE 1.

Referring to the drawings and particularly FIGURES 1 to 3, there is shown a rotor hub 10, which drives a plurality of blades (one shown at 11 in FIGURE 2). It should be understood that positioning means for pre-locating the blades prior to folding in order to place the blades in the most desirable position for folding is used but forms no part of the present invention. The blade 11 is connected to the rotor hub 10 through a horizontal pin 12, a pitch shaft 14, a pitch bearing housing 15, a vertical pin 16, and a blade adapter 17.

The horizontal pin 12 forms a flat hinge or pivot that permits the blade 11 to flap in a generally vertical plane. The horizontal pin 12 is attached to both the rotor hub 10 and the pitch shaft 14. The pitch bearing housing 15 surrounds a portion of the pitch shaft 14 and is supported thereon by bearings 18.

The pitch bearing housing 15 is connected to the pitch shaft 14 by well-known tension-torsion straps 19 whereby the pitch bearing housing 15 may rotate about the axis of the pitch shaft 14. One end of the straps 19 is connected to a pin 20 (see FIGURE 3), which is secured to the pitch shaft 14. The other end of the straps 19 is connected to a pin 21, which is attached to the pitch bearing housing 15.

The pitch bearing housing 15 is connected to the vertical pin 16, which functions as a lead-lag hinge or pivot to allow the blade adapter 17 to move transversely in a generally horizontal plane, through a plurality of vertically spaced members 22, 23, 24, and 25 (see FIGURE 3), which surround the pin 16. Each of the members 22, 23, 24, and 25 includes a pair of horizontally spaced arms, which are connected at the end by a cylindrical portion surrounding the vertical pin 16.

The blade adapter 17 has a plurality of vertically spaced members 26, 27, 28, and 29. Each of the members 26, 27, 28, and 29 has an opening adjacent its end for receiving the vertical pin 16.

The member 26 is disposed between the members 22 and 23 of the pitch bearing housing 15. The member 27 is disposed beneath the member 23 and the member 28 is disposed above the member 24. The member 29 is disposed between the members 24 and 25 of the pitch housing 15.

The vertical pin 16 includes a fixed annular member 30 and a rotatable annular member 31. The fixed annular member 30 is supported by an annular flange 32 resting on the member 22 of the pitch bearing housing 15 and secured thereto by suitable fastening means such as bolt 33, for example. The outer diameter of the rotatable member 31, which surrounds the reduced lower portion of the fixed member 30, is approximately the same as the outer diameter of the upper portion of the fixed annular member 30 whereby the pin 16 prevents a substantially constant outer diameter.

Teflon fabric bearings 34 are disposed between the pin 16 and the members 24, 25, 26, 27, 28, and 29 to permit relative movement thereof. The members 22, 23, 26, and 27 surround the upper portion of the fixed member 30 of the pin 16 while the members 24, 25, 28, and 29 surround the rotatable member 31 of the pin 16. Furthermore, there is a Teflon fabric bearing 35 disposed between the reduced lower portion of the fixed member 30 and the rotatable annular member 31.

The blade adapter 17 retains or supports the blade 11 thereon by suitable fastening means such as bolts 36 (see FIGURE 2), for example, extending through cooperating flanges 37 and 38 on the adapter 17 and the root end of the blade 11, respectively. Accordingly, a unitary connection is provided from the blade 11 to the pitch bearing housing 15 through the vertical pin 16.

A pitch arm 39 (see FIGURE 1) is connected to the pitch bearing housing 15 for controlling the pitch of the blade 11. Thus, movement of the pitch arm 39 by the pilot through a suitable mechanism (not shown) results in the pitch of the blade 11 being varied as desired.

A damper 40 is employed to limit the lead-lag movements of the blade 11 about the axis of the vertical pin 16. One end of the damper 40 is pivotally connected to a bracket 41 (see FIGURE 2). The bracket 41 is secured to a clamp 42, which is attached to the blade 11. The clamp 42 is formed of two cooperating semi-cylindrical sections, which fit around the root end of the blade 11 and are held together by suitable fastening means such as bolts 43, for example. The bolts 43 also attach the bracket 41 to the clamp 42.

The other end of the damper 40 is pivotally connected to an inboard damper support bracket 44. The support bracket 44 has its inner opening, which surrounds the pin 16, splined for cooperation with the splined outer upper end of the rotatable annular member 31 to form a spline connection 45 (see FIGURE 3) therebetween.

The rotatable annular member 31 is driven through a suitable connection at its lower end by an actuator. The axis of the actuator is disposed concentrically with the axis of the vertical pin 16 and forms a streamlined configuration therewith.

The actuator is a package unit including a reversible electric motor 46, a shaft 47, a gear train, and a housing 48. The actuator has an essentially inverted mushroom shape to permit easy mounting and removal of the lower portion of the actuator from the interior of the vertical pin 16.

The electrical motor 46, which is disposed within the upper end of the fixed annular member 30 of the vertical pin 16, is inserted through the opening end at the top of the fixed annular member 30 and is supported by a flange or shoulder 49 on the inner wall of the fixed annular member 30. The motor 46 is retained within the fixed annular member 33 by a nut 50, which cooperates with threads on the upper end of the inner wall of the member 30.

An actuator output drive member 51 is clamped to the rotatable annular member 31 of the vertical pin 16 by a retaining nut 52, which is threadedly connected to the upper end of the actuator output drive member 51 and has a shoulder 53 bearing against a flange 54 on the rotatable annular member 31. The retaining nut 52 has a flange 55 on its upper end for cooperation with a flange 56 on the lower end of the fixed annular member 30 to support the rotatable member 31 on the fixed member 30.

A bearing 57 is disposed between the lower surface of the flange 55 and the upper surface of the flange 56 to permit rotation of the retaining nut 52 with respect to the fixed member 30. A bearing 58 is positioned between the lower surface of the flange 56 and the upper surface of the flange 54 on the rotatable annular member 31 to allow rotation of the annular member 31 with respect to the fixed member 30. The retaining nut 52 is prevented from unscrewing from the output drive member 51 by suitable locking means such as self-locking insert 59.

The actuator is so constructed that the housing 48, which is disposed beneath the vertical pin 16, and the rotatable member 31 of the vertical pin 16 may rotate with respect to each other depending on which is restrained from rotation. Furthermore, movement of one with respect to the other is possible when neither is restrained from rotation.

The shaft 47 of the electric motor 46 drives the rotatable member 31 through the gear train and the splined connection on the output drive member 51 in one direction. The output drive member 51 extends into the housing 48 and has a gear portion (not shown) for cooperating with a ring gear (not shown), which is formed on the inner wall of the housing 48, through one or more planet gears (not shown). This allows the gear train to react against the housing 48 and tend to rotate the housing 48 in the opposite direction to rotation of the annular member 31.

As shown in FIGURE 4, the rotatable housing 48 of the actuator has a clevis 60, which is preferably formed integral therewith, attached thereto. The clevis 60 is pivotally connected by a pin 61 to an actuating arm 62, which has its other end pivotally connected by a pin 63 (see FIGURE 1) to an arm or link 64 at the lower end of an upstanding member 65. The arm 64 is formed integral with the member 65.

The upstanding member 65 is pivotally connected at its upper end by a pin 66 to a bracket 67, which is preferably formed integral with the pitch housing 15. The upper end of the member 65 has a projection 68, which has an end face 69 for cooperation with a portion of the pitch housing 15 to limit movement of the linkage.

The member 65 has an arm or link 70, which is formed integral therewith, disposed above the arm 64. The other end of the link 70 is pivotally connected by a pin 71 to one end of an arm 72. The other end of the arm 72 is pivotally connected by a pin 73 to a link 74, which has its other end pivotally connected by a pin 75 to a pitch lock pin 76.

The arm 72 is connected to a lower arm or link 77 of a member 78, which is pivotally connected to the arm 72 by a pin 79. As shown in FIGURES 1 and 2, the pivotal connection of the member 78 to the arm 72 is closer to the pin 73 than to the pin 71. The position of the pin 79 is predetermined to accurately control the sequence of motion of the projection 68, the pitch lock pin 76, and the member 78.

As shown in FIGURE 3, the member 78 is pivotally mounted on the pin 21 by an upper arm or link 80. The main body of the member 78 has a clamping portion 81 for cooperation with a portion or surface 82 (see FIGURE 1) of the inboard support bracket 44 to clamp the bracket 44 so that the blade 11 is held in its unfolded or flight position. The main body of the member 78 also has a pawl interlock 83, which is a curved finger, extending therefrom for cooperation with a circular portion 84 (see FIGURE 2) of the inboard damper support bracket 44 when the inboard support bracket 44 is rotated to move the blade 11 from its unfolded position to its folded position.

The upper portion of the main body of the member 78 has a notch or receptacle 85 (see FIGURE 2) formed therein for cooperation with a gear tooth 86 on the bracket 44. The gear tooth 86 is secured within a groove 87 in the inboard damper support bracket 44 by suitable means (not shown) such as bolts, for example. The portion 82, which cooperates with the clamping portion 81 of the member 78, is formed by undercutting the bracket 44 beneath the portion holding the gear tooth 86 and above the circular portion 84 of the bracket 44.

Whenever the motor 46 of the actuator is energized, the clevis 60 and the inboard damper support bracket 44 tend to exert approximately equal and opposite torques. Both the clevis 60 and the support bracket 44 are designed to apply torque in planes substantially perpendicular to the pivotal axis of the vertical pin 16. Thus, the torque of the clevis 60 tends to act parallel but opposite to the torque of the damper support bracket 44.

If either the clevis 60 or bracket 44 is held stationary, the other becomes a movable member and is able to apply the full torque of its output. However, both the clevis 60 and the bracket 44 may produce an output at the same time.

With the blade 11 in its unfolded position, the pitch lock pin 76 is disposed in a passage 88 in the pitch bearing housing 15. When the clevis 60 is driven clockwise, as viewed from above in FIGURE 1, the member 65 and its integrally formed links 64 and 70 are rotated counter-clockwise. Thus, as the clevis 60 rotates the link 70 counter-clockwise, the pitch lock pin 76 is advanced through a bushing 89 (see FIGURE 3), which is disposed within a passage in the pitch shaft 14. Since the pitch shaft 14 is not rotatable about the pitch axis of the pitch bearing housing 15, the pitch lock pin 76 locks the pitch bearing housing 15 to the pitch shaft 14 and thereby locks the pitch of the blade 11.

Advancement of the pitch lock pin 76 into the bushing 89 is limited by engagement of the end face 69 of the projection 68 of the member 65 against a portion of the pitch housing 15. This portion of the pitch housing 15 functions as a stop to prevent further clockwise movement of the clevis 60. Additionally, the linkage is so designed that the actuating arm 62 and the arm 64 form a straight line connection (see FIGURE 8) when the end face 69 of the projection 68 engages the pitch housing 15. This arrangement as well as the cooperation of the pawl 83 and the circular portion 84 prevents withdrawal of the pitch lock pin 76 from the bushing 89 when the direction of the actuator motor 46 is reversed.

During clockwise movement of the clevis 60, the member 78 rotates clockwise about the pin 21. This clockwise movement of the member 78 results in the receptacle 85 being moved to allow the gear tooth 86 to be moved out of mating engagement therewith by counter-clockwise rotation of the bracket 44. Until the gear tooth 86 ceases mating engagement with the receptacle 85 in the member 78, the amount of counter-clockwise rotation of the bracket 44 is limited.

The pitch housing 15 has a pair of vertically spaced arms 90 and 91 (see FIGURE 3) extending therefrom. The arms 90 and 91 have end faces 92 and 93, respectively, for cooperation with spaced portions 94 (see FIGURE 2) and 85 (see FIGURE 3), respectively, of the bracket 44. Thus, the bracket 44 is retained between the arms 90 and 91 of the pitch housing 15 and the clamping portion 81 of the member 78 to hold the blade 11 in its unfolded or flight condition. This clamping arrangement eliminates any vibration between these parts. However, as soon as the member 78 rotates clockwise, the clamping portion 81 of the member 78 ceases to clamp against the portion 82 (see FIGURE 1) of the inboard damper support bracket 44.

When clockwise rotation of the clevis 60 is stopped by the end face 69 engaging the pitch housing 15, the gear tooth 86 has been released and is no longer disposed within the receptacle 85 of the member 78. In order to insure that the receptacle 85 remains in the desired position during counter-clockwise movement of the bracket 44, the pawl interlock 83 of the member 78 rides along the circular portion 84 of the bracket 44.

The fixed annular member 30 of the vertical pin 16 has a cam 96 fixedly secured thereto. A roller 97, which is rotatably mounted on a member or link 98 by a pin 99 and functions as a cam follower, cooperates with surface 100 of the cam 96. One end of the member 98 is pivotally connected by a pin 101 to one end of an arm or link 102, and the other end of the member 98 is pivotally connected to the bracket 44 by a pin 103. The other end of the arm 102 is pivotally connected by a pin 104 to a bifurcated bracket 105, which is preferably formed integral with the blade adapter 17. The arm 102 extends through a cut out portion 106 (see FIGURE 3), which is between the members 27 and 28, in the blade adapter 17.

When the blade is in its unfolded or flight condition, the roller 97 is spaced a sufficient distance from the cam 96 so that there is no interference therebetween during normal lead-lag flight motions. However, as the bracket 44 rotates counter-clockwise, the member 98 is moved to pull the roller 97 into contact with the surface 100 of the cam 96. Continued counter-clockwise rotation causes the roller 97 to transverse the cam 96 and while both the blade and the damper 40 rotate counter-clockwise the blade 11 is caused to advance more rapidly than the damper 40. This results in the damper 40 being compressed so that all lead-lag motion of the blade 11 about the pivotal axis of the vertical pin 16, which is the lead-lag hinge, is eliminated as the blade 11 is being moved to its folded position.

As depicted in the drawings, there is illustrated the cam surface 100, which would be employed if the blade were to be folded in a clockwise direction. That is, in a multi-bladed rotor, it is often necessary to fold a portion of the blades in a clockwise direction and a portion of the blades in a counter-clockwise direction. In this regard, it should be understood that with the exception of the damper 40, the remainder of the mechanism disclosed would be inverted and the direction of rotation reversed for any blade being folded in a clockwise direction. Thus, it can be readily understood that with the damper 40 remaining as shown in the drawings, the damper 40 would be extended during clockwise blade folding rather than compressed when folded in a counter-clockwise direction.

Counter-clockwise movement of the bracket 44 is stopped when a portion 107 of the bracket 44 engages a portion 108 of the pitch bearing housing 15. Thus, further movement of the blade 11 about the vertical pin 16 is prevented. The actuator retains the blade 11 in its folded position.

Considering the operation of the blade-folding mechanism of this invention, it should be understood that FIGURES 1, 3, and 5 illustrate the position of the blade-folding mechanism when the rotor blade 11 is in its unfolded condition and prepared for flight. In this position of the rotor blade 11, the pitch lock pin 76 is withdrawn from the bushing 89 in the pitch shaft 14 for unlocking the blade pitch controls. Additionally, the gear tooth 86 is mated with the receptacle 85 of the member 78. The bracket 44 is prevented from rotation by the clamping portion 81 of the member 78 and the end faces 92 and 93 of the arms 90 and 91 on the pitch housing 15.

When the blade 11 is in its flight condition and the motor 46 of the actuator is energized for folding the blade 11, the clevis 60 and the bracket 44 attempt to rotate in opposite directions. However, until the clevis 60 rotates to move the member 78 and the clamping portion 81 thereby, the bracket 44 cannot rotate. Of course, as soon as the clamping portion 81 of the member 78 is moved away from the portion 82 of the bracket 44 by rotation of the clevis 60, the bracket 44 may begin to rotate.

Referring particularly to FIGURES 5 to 10, when the blade 11 is in flight condition and the actuator motor 46 is energized, the clevis 60 rotates clockwise about the pivotal axis of the vertical pin 16. This not only initiates advancement of the pitch lock pin 76 into the bushing 89 of the pitch shaft 14 (see FIGURE 6) but also causes slight clockwise rotation of the member 78 about the pin 21. This rotation of the member 78 is the beginning of the phasing in of the counter-clockwise drive of the bracket 44 about the pin 16.

Since the clockwise movement of the member 78 moves the receptacle 85 so that the gear tooth 86 may begin to cease mating engagement therewith, the movement of the gear tooth 86 does not prevent counter-clockwise movement of the bracket 44. Accordingly, the tooth 86 is advanced out of the receptacle 85 as the member 78 and the tooth 86, which is attached to the bracket 44, move away from each other as shown in FIGURE 7.

Restriction of the blade 11 in a lag direction, which is clockwise about the axis of the pin 16, also occurs when the mechanism is in the position of FIGURE 6. This occurs since the movement of the bracket 44 has caused the damper 40 to extend a small amount. This extension now causes the damper 40 to have less capability to allow the blade 11 to move in the lag direction. The full travel range has been reduced.

It will be observed from FIGURE 6 that the amount of rotation of the clevis 60 is very slight in order to advance the pitch lock pin 76 into the bushing 89 to lock the pitch housing 15. However, the pitch lock pin 76 continues to advance into the bushing 89 until the position of FIGURE 8 is reached in which the end face 69 of the projection 68 contacts a portion of the pitch bearing housing 15. When this occurs, the actuating arm 62 and the arm 64 of the member 65 are in a straight line arrangement with each other so that the reversal of the direction of rotation of the actuator motor 44 will not withdraw the pitch lock pin 76 from its locking position. At this time, the cooperation between the pawl interlock 83 and the circular portion 84 is beginning.

It should be noted that while the counter-clockwise rotation of the bracket 44 begins phasing in as soon as the clamping portion 81 of the member 78 ceases to engage the portion 82 of the bracket 44, the rate of rotation of the bracket 44 is retarded as long as the clevis 60 is rotating. During this time, the pawl interlock 83 is guided along the end of the circular portion 84 and does not clear it until just before the clevis 60 is prevented from further clockwise rotation by engagement of the projection 68 with the pitch housing 15.

Since the bracket 44 rotates counter-clockwise while the clevis 60 is rotating, the roller 97 engages the surface 100 of the cam 96 (see FIGURE 7) after only a slight amount of counterclockwise rotation of the bracket 44. Because the arm 98 is pivotally connected to the bracket 44 by the pin 103, the roller 97 is actually pulled into engagement with the surface 100 of the cam 96 during the first stage of rotation of the bracket 44. However, as may be seen by reference to the motion illustrated in FIGURES 6 and 7 and as set forth above, the blade adapter 17 does not tend to move during this stage of rotation of the bracket 44 because the connection of the arm 102 to the bracket 105 through the pin 104 is pivotal and movement will tend to be absorbed by slight extension of the damper 40.

With the roller 97 in engagement with the surface 100 of the cam 96, further counter-clockwise rotation of the bracket 44 causes both the damper 40 and the blade adapter 17 to start counter-clockwise rotation about the pin 16. Thus, as set forth above, the engagement of the roller 97 with the surface 100 of the cam 96 causes the blade 11 to have a faster angular rotation than the damper 40. This relative angular movement between the blade 11 and the damper 40 occurs to compress the damper 40.

Figure 9:
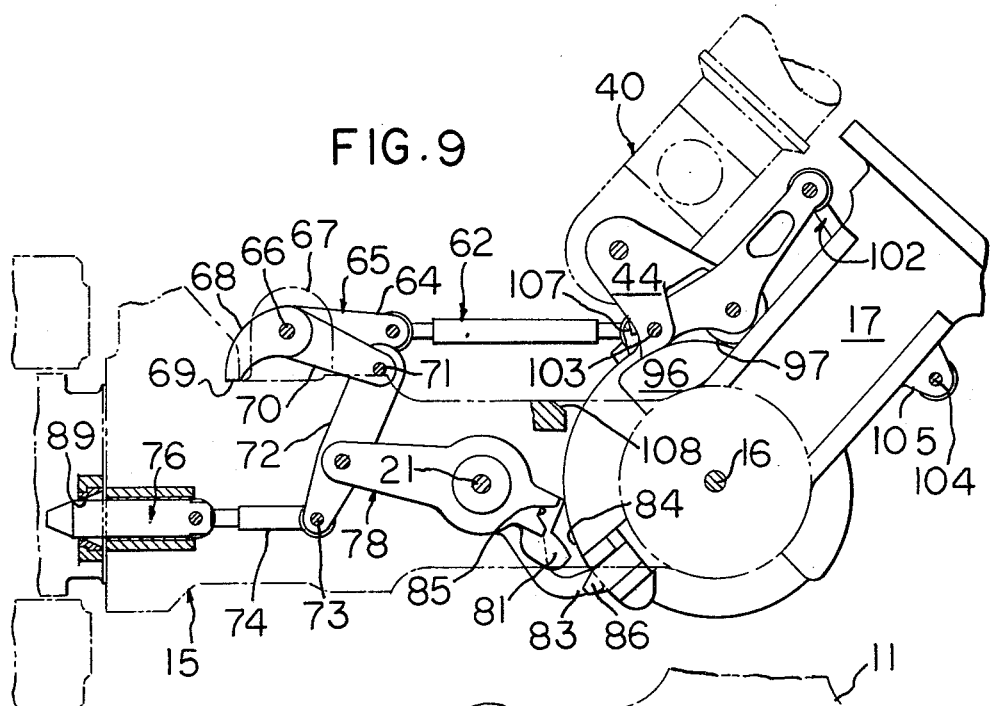
FIGURE 9 is a schematic view, similar to FIGURE 5, at a point during folding operations beyond that of FIGURE 8 in which the damper is fully compressed.

When the blade 11 has been advanced to the position of FIGURE 9, the damper 40 is fully compressed so that any lead-lag motion of the rotor blade 11 about the vertical pin 16 is blocked out. Since the damper 40 is fully compressed, the blade 11 may not be moved by wind forces or the like toward the damper 40 because of the full compression of the damper 40. Any movement of the blade 11 away from the damper 40 is prevented by the connection of the arm 98 to the bracket 44 and the blade adapter 17 and the position of the roller 97 on the cam 96. Thus, wind forces or the like may not cause lead-lag movements of the rotor blade 11.

Figure 10:
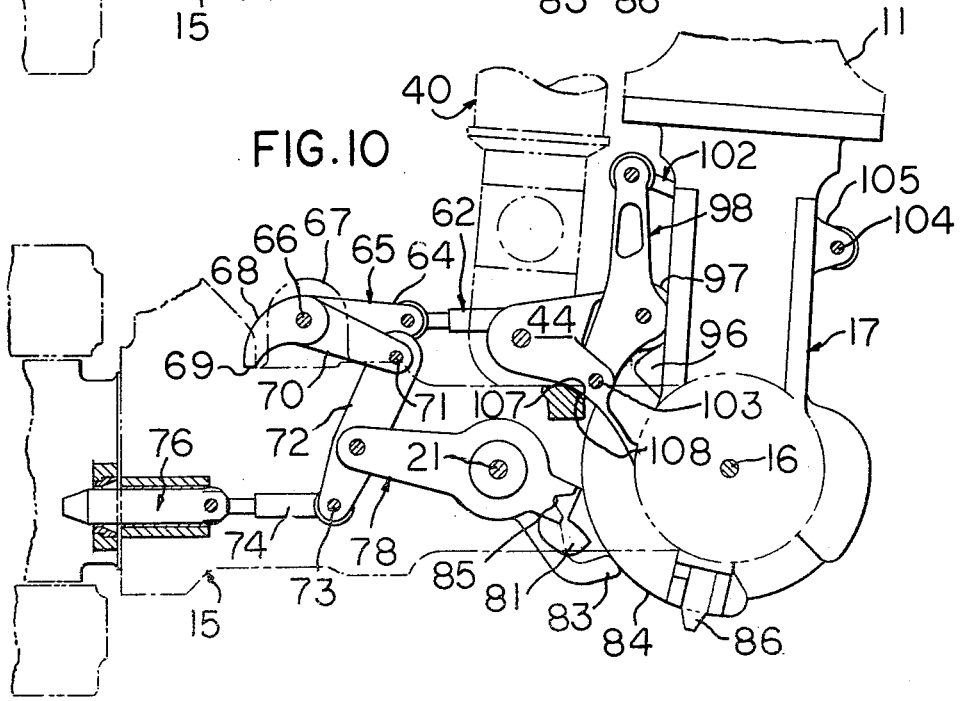
FIGURE 10 is a schematic view, similar to FIGURE 5, showing the blade in its folded position.

Counter-clockwise rotation of the blade 11 continues until the portion 107 of the bracket 44 engages the portion 108 of the pitch bearing housing 15. This engagement is shown in FIGURE 10 wherein the blade 11 is in its fully folded position. The actuator is employed to retain the blade 11 in its fully folded position.

When it is desired to accomplish an unfold cycle, the actuator motor 46 is energized in the opposite direction. Thus, during an unfold cycle, the actuator drive members (the clevis 60 and the bracket 44) again exert substantially equal and opposite torques. However, each exerts rotational torque in a direction opposite to the direction in which it provided torque during the fold cycle and the sequence of the unfold cycle is the same as the fold cycle but in reverse.

When the blade 11 is in its folded position, the clevis 60 is held from driving because the actuating arm 62 and the arm or link 64 of the member 65 are in a straight line relation with each other and the member 65 is locked in one direction against the pitch housing 15 by the end face 69 of the projection 68. Additionally, contact between the pawl 83 and the circular portion 84 restrains movement of the arm 72 and the member 65 in the other direction. Accordingly, the clevis 60 is a stationary member and the bracket 44 is a movable actuator member at the start of the unfold cycle.

In this arrangement, the bracket 44 rotates clockwise to return the blade 11 toward its unfolded or flight position. As the bracket 44 rotates clockwise, the pawl interlock 83 of the member 78 rides along the circular portion 84 of the bracket 44 to insure that the receptacle 85 in the member 78 is positioned to receive the gear tooth 86 of the bracket 44 when it reaches the receptacle 85.

When the gear tooth 86 enters the receptacle 85, the member 78 is rotated counter-clockwise about the pin 21 to break the straight line relation of the actuating arm 62 and the arm 64 of the member 65. This allows the clevis 60 to begin counter-clockwise rotation about the axis of the vertical pin 16. Shortly after the gear tooth 86 engages the receptacle 85 in the member 78, the blade adapter 17 and the blade 11 reach the fully unfolded position.

When the clevis 60 begins its counter-clockwise rotation, the link 70 of the member 65 rotates clockwise about the pin 66 to cause retraction of the locking pin 76 from the bushing 89 in the pitch shaft 14. As the locking pin 76 is removed from the bushing 89 in the pitch shaft 14, clockwise movement of the bracket 44 is stopped by contact of the portions 94 and 95 of the bracket 44 with the end faces 92 and 93 of the arms 90 and 91, respectively, of the pitch housing 15. During this final stage of rotation of the clevis 60, the clamping portion 81 of the member 78 is urged into firm engagement with the portion 82 of the bracket 44 to hold the bracket 44 in the position in which the blade 11 is maintained in its unfolded or flight condition. Additionally, this final movement of the clevis 60, which is stopped by engagement with a portion 109 (see FIGURE 5) of the pitch housing 15, completely withdraws the locking pin 76 from the bushing 89 of the pitch shaft 14 so that it is disposed only within the passage 88 in the pitch housing 15.

In this position, the roller 97 is positioned a sufficient distance from the surface 100 of the cam 96 to permit normal lead-lag motions of the blade 11 about the axis of the vertical pin 16, which is the lead-lag hinge or pivot, to be limited only by the damper 40. Furthermore, the pitch housing 15 may be readily moved with respect to the pitch shaft 14 by actuation of the pitch arm 39.

Because of the arrangement of the linkage connected to the clevis 60, the loads on the damper 40 are not fed into the actuator when the blade 11 is in its flight position. Of course, no damper loads are fed into the actuator through the linkage when the blade 11 is in a lagging position because all loads, which are fed into the damper bracket 44 by the blade 11 in its lagging position, are absorbed by the arms 90 and 91 on the pitch housing 15.

However, the damper bracket 44 could feed loads, which result from the blade 11 being in a leading position, into the actuator since these damper loads act against the clamping portion 81 of the member 78 through the portion 82 of the bracket 44. The damper loads acting on the clamping portion 81 of the member 78 are absorbed through the link 72, the link 70 of the member 65, and the actuating arm 62. It should be observed that the link 72 and the link 70 of the member 65 are not disposed in a straight line relation in FIGURES 1 and 5 but are offset slightly to the left.

Accordingly, any tendency of clockwise movement of the member 78 tends to urge the pin 71 to the left (as viewed in FIGURES 1 and 5). However, movement of the pin 71 to the left is prevented by the abutment of the clevis 60 with the stop portion 109 of the pitch housing 15. Thus, no damper loads can be fed into the actuator when the blade 11 is in its flight position.

It should be understood that at least a portion of this invention may be summarized by considering the housing 15 and the adapter 17 as first and second members of a rotary wing which is foldable about its lead-lag pivot or vertical pin connection. The damper 40 is connected to the first and second rotary wing members as a lead-lag control means. Additionally, the blade folding mechanism such as that comprising the drive through the clevis 60 to the clamping portion 81 and the drive through the member 44 operate as a first movable connection means. Attached to the first movable connection means, which is connected to the damper 40, is a second movable connection means, which includes the links 98 and 102 as well as the rotatable cam follower 97. The cam follower 97 operates in conjunction with the cam surface 100 or second control means, which controls the movement induced in the second movable connection means by the first movable connection means.

While the present invention has been described with respect to a single blade on a rotor hub, it should be understood that one or more of the other blades on the rotor hub 10 may employ the mechanism of the present invention or a different blade folding structure, if desired. Furthermore, it should be understood that the present invention may be utilized on a blade or blades of each of a plurality of rotor hubs on a helicopter such as in a coaxial or tandem arrangement, for example. Additionally, it should be understood that the lead-lag positioning mechanism of this invention may be employed with other types of blade folding means.

While the present invention has described the articulation of the rotor blade as being provided by the flap hinge or pivot and the lead-lag hinge or pivot, it should be understood that other devices may be so employed to produce the articulation. In accordance therewith, the blade folding mechanism of this invention is capable of utilization for folding rotor blades associated with such other types of articulation devices.

An advantage of this invention is that it reduces the overall weight of the blade folding mechanism and, thereby, the weight of the helicopter by aiding in the elimination of an extra pin for folding the blade. A further advantage of this invention is that lead-lag movements of the blade are eliminated during the folding cycle and when in its folded position about the lead-lag pivot. Another advantage of this invention is that all steps in either blade folding or unfolding on the rotor head are carried out automatically by a single actuator mechanism. A still further advantage of this invention is that the profile drag forces, which are associated with the rotor hub assembly, are minimized due to a reduced frontal area of the uncomplicated mechanism involved.

For purposes of exemplification, a particular embodiment of the invention has been shown and described according to the present understanding thereof. However, it will be apparent that changes and modifications in the arrangement and construction of the parts thereof may be resorted to without departing from the spirit and scope of the invention.

We claim:

1. In a rotary wing aircraft having a lead-lag pivot, rotor blade means movable about said lead-lag pivot, means to control lead-lag movements of said rotor blade means about said lead-lag pivot, the improvement comprising a mechanism for folding and unfolding said rotor blade means about said lead-lag pivot, said mechanism including means to move said rotor blade means about said lead-lag pivot from its unfolded position to its folded position and means to inactivate said lead-lag control means during movement of said rotor blade means to its folded position whereby undesired lead-lag movements of said rotor blade means are eliminated during the folding of said rotor blade means and its folded position is accurately predetermined.

2. In a rotary wing aircraft having a lead-lag pivot, rotor blade means movable about said lead-lag pivot, means to control lead-lag movements of said rotor blade means about said lead-lag pivot, the improvement comprising a mechanism for folding and unfolding said rotor blade means about said lead-lag pivot, said mechanism including means to move said rotor blade means about said lead-lag pivot from its unfolded position to its folded position, said lead-lag control means having one end connected to said rotor blade means and the other end connected to said moving means, and means to inactivate said lead-lag control means during folding of said rotor blade means whereby undesired lead-lag movements of said rotor blade means are eliminated during the folding of said rotor blade means and its folded position is accurately predetermined.

3. In a rotary wing aircraft having a lead-lag pivot, rotor blade means movable about said lead-lag pivot, means to control lead-lag movements of said rotor blade means about said lead-lag pivot, the improvement comprising a mechanism for folding and unfolding said rotor blade means about said lead-lag pivot, said mechanism including means to move said rotor blade means about said lead-lag pivot from its unfolded position to its folded position, a cam fixed to said lead-lag pivot, a member connected to said rotor blade means for movement therewith, and said member having means cooperating with said cam when said rotor blade means is moved to its folded position to move said rotor blade means relative to said lead-lag control means during folding to inactivate said lead-lag control means whereby undesired lead-lag movements of said rotor blade means are eliminated during the folding of said rotor blade means and its folded position is accurately predetermined.

4. In a rotary wing aircraft having a lead-lag pivot, rotor blade means movable about said lead-lag pivot, means to control lead-lag movements of said rotor blade mean about said lead-lag pivot, the improvement comprising a mechanism for folding and unfolding said rotor blade means about said lead-lag pivot, said mechanism including means to move said rotor blade means about said lead-lag pivot from its unfolded position to its folded position, a cam fixed to said lead-lag pivot, a member connected to said rotor blade means for movement therewith, and said member having a roller cooperating with said cam when said rotor blade means is moved to its folded position to move said rotor blade means relative to said lead-lag control means during folding to inactivate said lead-lag control means whereby undesired lead-lag movements of said rotor blade means are eliminated during the folding of said rotor blade means and its folded position is accurately predetermined.

5. In a rotary wing aircraft having a lead-lag pivot, rotor blade means movable about said lead-lag pivot, means to control lead-lag movements of said rotor blade means about said lead-lag pivot, the improvement comprising a mechanism for folding and unfolding said rotor blade means about said lead-lag pivot, said mechanism including means to move said rotor blade means about said lead-lag pivot from its unfolded position to its folded position and means to cause faster rotation of said rotor blade means about said lead-lag pivot during folding with respect to rotation of said lead-lag control means about said lead-lag pivot whereby said lead-lag control means is inactivated to eliminate undesired lead-lag movements of said rotor blade means during the folding of said rotor blade means and its folded position is accurately predetermined.

6. In a rotary wing aircraft having a lead-lag pivot, rotor blade means movable about said lead-lag pivot, means to control lead-lag movements of said rotor blade means about said lead-lag pivot, the improvement comprising a mechanism for folding and unfolding said rotor blade means about said lead-lag pivot, said mechanism including actuating means having first output means and second output means for exerting forces in opposite direction, means to lock said rotor blade means when said rotor blade means is in its unfolded position to prevent pitch change of said rotor blade means, means connecting said first output means to said lock means whereby said lock means is moved by said first output means to its locking position, means to inactivate said first output means after said lock means is in its locking position, means connecting said second output means to one end of said lead-lag control means, said lead-lag control means having its other end connected to said rotor blade means, said second output means moving said rotor blade means to its folded position, and means to inactivate said lead-lag control means during movement of said rotor blade means by said second output means to its folded position whereby undesired lead-lag movements of said rotor blade means are eliminated.

7. In a rotary wing aircraft having a lead-lag pivot, rotor blade means movable about said lead-lag pivot, means to control lead-lag movements of said rotor blade means about said lead-lag pivot, the improvement comprising a mechanism for folding and unfolding said rotor blade means about said lead-lag pivot, said mechanism including actuating means having first output means and second output means for exerting forces in opposite direction, means to lock said rotor blade means when said rotor blade means is in its unfolded position to prevent pitch change of said rotor blade means, means connecting said first output means to said lock means whereby said lock means is moved by said first output means to its locking position, means to inactivate said first output means after said lock means is in its locking position, means connecting said second output means to one end of said lead-lag control means, said lead-lag control means having its other end connected to said rotor blade means, said second output means moving said rotor blade means to its folded position, a cam fixed to said lead-lag pivot, a member connected to said rotor blade means for movement therewith, and said member having means cooperating with said cam during movement of said rotor blade means to its folded position to move said rotor blade means relative to said lead-lag control means during folding to inactivate said lead-lag control means whereby undesired lead-lag movements of said rotor blade means are eliminated.

8. In a rotary wing aircraft having a lead-lag pivot, rotor blade means movable about said lead-lag pivot, means to control lead-lag movements of said rotor blade means about said lead-lag pivot, the improvement comprising a mechanism for folding and unfolding said rotor blade means about said lead-lag pivot, said mechanism including actuating means having first output means and second output means for exerting forces in opposite direction, means to lock said rotor blade means when said rotor blade means is in its unfolded position to prevent pitch change of said rotor blade means, means connecting said first output means to said lock means whereby said lock means is moved by said first output means to its locking position, means to inactivate said first output means after said lock means is in its locking position, means connecting said second output means to one end of said lead-lag control means, said lead-lag control means having its other end connected to said rotor blade means, said second output means moving said rotor blade means to its folded position, a cam fixed to said lead-lag pivot, a member connected to said rotor blade means for movement therewith, and said member having a roller cooperating with said cam during movement of said rotor blade means to its folded position to move said rotor blade means relative to said lead-lag control means during folding to inactivate said lead-lag control means whereby undesired lead-lag movements of said rotor blade means are eliminated.

9. In a rotary wing aircraft having a lead-lag pivot, rotor blade means movable about said lead-lag pivot, means to control lead-lag movements of said rotor blade means about said lead-lag pivot, the improvement comprising a mechanism for folding and unfolding said rotor blade means about said lead-lag pivot, said mechanism including actuating means having first output means and second output means for exerting forces in opposite direction, means to lock said rotor blade means when said rotor blade means is in its unfolded position to prevent pitch change of said rotor blade means, means connecting said first output means to said lock means whereby said lock means is moved by said first output means to its locking position, means to inactivate said first output means after said lock means is in its locking position, means connecting said second output means to one end of said lead-lag control means, said lead-lag control means having its other end connected to said rotor blade means, said second output means moving said rotor blade means to its folded position, and means to cause faster rotation of said rotor blade means about said lead-lag pivot during folding with respect to rotation of said lead-lag control means about said lead-lag pivot whereby said lead-lag control means is inactivated to prevent undesired lead-lag movements of said rotor blade means.

10. In a rotary wing aircraft having a lead-lag pivot, rotor blade means movable about said lead-lag pivot, means to control lead-lag movements of said rotor blade means about said lead-lag pivot, the improvement comprising a mechanism for folding and unfolding said rotor blade means about said lead-lag pivot, said mechanism including actuating means having first output means and second output means for exerting forces in opposite directions, means to lock said rotor blade means when said rotor blade means is in its unfolded position to prevent pitch change of said rotor blade means, linkage means connecting said first output means to said lock means, said first output means moving said lock means to its locking position through said connecting linkage means, means to render said first output means inactive after said lock means is in its locking position, said second output means being connected to said rotor blade means to rotate said rotor blade means about said lead-lag pivot to its folded position, and means to inactivate said lead-lag control means during folding of said rotor blade means by said second output means to prevent undesired lead-lag movements of said rotor blade means.

11. In a rotary wing aircraft having a lead-lag pivot, rotor blade means movable about said lead-lag pivot, means to control lead-lag movements of said rotor blade means about said lead-lag pivot, the improvement comprising a mechanism for folding and unfolding said rotor blade means about said lead-lag pivot, said mechanism including actuating means having first output means and second output means for exerting forces in opposite directions, means to lock said rotor blade means when said rotor blade means is in its unfolded position to prevent pitch change of said rotor blade means, linkage means connecting said first output means to said lock means, said first output means moving said lock means to its locking position through said connecting linkage means, means to render said first output means inactive after said lock means is in its locking position, said lead-lag control means having one end connected to said rotor blade means and its other end connected to said second output means, said second output means moving said rotor blade means about said lead-lag pivot to its folded position, and means to inactivate said lead-lag control means during folding of said rotor blade means to prevent undesired lead-lag movements of said rotor blade means.

12. In a rotary wing aircraft having a lead-lag pivot, rotor blade means movable about said lead-lag pivot, means to control lead-lag movements of said rotor blade means about said lead-lag pivot, the improvement comprising a mechanism for folding and unfolding said rotor blade means about said lead-lag pivot, said mechanism including actuating means having first output means and second output means for exerting forces in opposite directions, means to lock said rotor blade means when said rotor blade means is in its unfolded position to prevent pitch change of said rotor blade means, linkage means connecting said first output means to said lock means, said first output means moving said locking means to its locking position through said connecting linkage means, means to render said first output means inactive after said lock means is in its locking position, said second output means being connected to said rotor blade means to rotate said rotor blade means about said lead-lag pivot to its folded position, a cam fixed to said lead-lag pivot, a member connected to said rotor blade means for movement therewith, and said member having means cooperating with said cam during movement of said rotor blade means to its folded position to move said rotor blade means relative to said lead-lag control means during folding to inactivate said lead-lag control means to prevent undesired lead-lag movements of said rotor blade means.

13. In a rotary wing aircraft having a lead-lag pivot, rotor blade means movable about said lead-lag pivot, means to control lead-lag movements of said rotor blade means about said lead-lag pivot, the improvement comprising a mechanism for folding and unfolding said rotor blade means about said lead-lag pivot, said mechanism including actuating means having first output means and second output means for exerting forces in opposite directions, means to lock said rotor blade means when said rotor blade means is in its unfolded position to prevent pitch change of said rotor blade means, linkage means connecting said first output means to said lock means, said first output means moving said lock means to its locking position through said connecting linkage means, means to render said first output means inactive after said lock means is in its locking position, said second output means being connected to said rotor blade means to rotate said rotor blade means about said lead-lag pivot to its folded position, a cam fixed to said lead-lag pivot, a member connected to said rotor blade means for movement therewith, and said member having a roller cooperating with said cam during movement of said rotor blade means to its folded position to move said rotor blade means relative to said lead-lag control means during folding to inactivate said lead-lag control means to prevent undesired lead-lag movements of said rotor blade means.

14. In a rotary wing aircraft having a lead-lag pivot, rotor blade means movable about said lead-lag pivot, means to control lead-lag movements of said rotor blade means about said lead-lag pivot, the improvement comprising a mechanism for folding and unfolding said rotor blade means about said lead-lag pivot, said mechanism including actuating means having first output means and second output means for exerting forces in opposite directions, means to lock said rotor blade means when said rotor blade means is in its unfolded position to prevent pitch change of said rotor blade means, linkage means connecting said first output means to said lock means, said first output means moving said lock means to its locking position through said connecting linkage means, means to render said first output means inactive after said lock means is in its locking position, said second output means being connected to said rotor blade means to rotate said rotor blade means about said lead-lag pivot to its folded position, and means to cause faster rotation of said rotor blade means about said lead-lag pivot during folding with respect to rotation of said lead-lag control means about said lead-lag pivot whereby said lead-lag control means is inactivated to prevent undesired lead-lag movements of said rotor blade means.

15. In a rotary wing having a first member and a second member connected in lead-lag relationship and first control means connected to the first and second members for permitting predetermined lead-lag motions therebetween, lead-lag restricting means including first movable connection means for connecting the first control means to the first member, second movable connection means connected to said first movable connection means and the second member and being responsive to movement of said first movable connection means for providing relative movement between the second member and the first control means, and second control means mounted on the first member for controlling movement of said second movable connection means whereby movement of said second movable connection means restricts the predetermined lead-lag motions permitted by the first control means when the second member is folded about its lead-lag connection with the first member.

16. In a rotary wing, restricting means as claimed in claim 15 wherein said second movable connection means comprises a first link connected to said first movable connection, a second link connected to the second member and to said first link, and rotatable means mounted on said first link responsive to said second control means.

17. In a rotary wing, restricting means as claimed in claim 16 wherein said second control means comprises a cam surface on the first member for cooperating with said rotatable means for controlling movement of said second movable connection means.

No references cited.

JULIUS E. WEST, *Primary Examiner.*